(12) United States Patent
Wang

(10) Patent No.: US 6,926,549 B2
(45) Date of Patent: Aug. 9, 2005

(54) ELECTRIC CARD FASTENER WITH ELASTIC METAL CANTILEVER

(75) Inventor: Chun-Sheng Wang, Taoyuan (TW)

(73) Assignee: Speed Technology Corp., Taoyuan (TW)

( * ) Notice: Subject to any disclaimer, the term of this patent is extended or adjusted under 35 U.S.C. 154(b) by 0 days.

(21) Appl. No.: 10/721,294

(22) Filed: Nov. 26, 2003

(65) Prior Publication Data

US 2005/0112927 A1 May 26, 2005

(51) Int. Cl.[7] .......................................... H01R 13/62
(52) U.S. Cl. ...................... 439/326; 439/567; 439/629; 439/159
(58) Field of Search ............................... 439/326–328, 439/567, 629–632, 159

(56) References Cited

U.S. PATENT DOCUMENTS

| | | | | |
|---|---|---|---|---|
| 6,042,411 | A * | 3/2000 | Choy | 439/328 |
| 6,162,069 | A * | 12/2000 | Choy | 439/92 |
| 6,164,998 | A * | 12/2000 | Poi et al. | 439/326 |
| 6,276,951 | B1 * | 8/2001 | Chen et al. | 439/327 |
| 6,540,550 | B2 * | 4/2003 | Chang et al. | 439/541.5 |
| 6,626,685 | B2 * | 9/2003 | Toda | 439/92 |
| 6,634,899 | B2 * | 10/2003 | Takahiro et al. | 439/328 |
| 6,666,702 | B1 * | 12/2003 | Pickles | 439/328 |
| 6,743,028 | B2 * | 6/2004 | Wang | 439/92 |

* cited by examiner

*Primary Examiner*—Truc Nguyen
(74) *Attorney, Agent, or Firm*—Troxell Law Office, PLLC

(57) ABSTRACT

The present invention provides an electric card fastener with elastic metal cantilever, configured to a circuit board, for fastening an electric card. The electric card fastener is formed by a corresponding mounted base. The mounted base includes a cantilever with a restricted portion disposed along and a mounted portion on the button, connecting with one end of the cantilever. After the connection of the cantilever and the mounted portion, the cantilever is elastic for backward and forward movement. Whereby, the electric card fastener fastens the electric card in a predetermined position for preventing poor electrical connection and strengthening the construction of components of the present invention for improving support ability, and the fastening components are used as a short cut for the grounding circuit on the electric card to connect ground.

6 Claims, 5 Drawing Sheets

ELECTRIC CARD FASTENER WITH ELASTIC METAL CANTILEVER

FIELD OF THE INVENTION

The present invention is related to an electric card fastener with elastic metal cantilever. More particularly, the electric card fastener fastens the electric card in a predetermined position for preventing poor electrical connection and strengthening the construction of components of the present invention for improving support ability, and the fastening components are used as a short cut for the grounding circuit on the electric card to connect ground.

BACKGROUND OF THE INVENTION

In the prior art, the electric card fastener, disclosed in the Taiwan Patent No. 545747, configured to a circuit board, includes: a connector, configured on the circuit board, having a non-conduct body and a slot disposed in front of the non-conduct body, wherein a plurality of terminals are disposed in the slot; an electric card with its front end inserted in the slot, wherein a lock portion is disposed on the electric card; and at least one hook member, made of plastic material in one-piece shape with hooks extending upward, configured on the circuit board apart from the connector, wherein the hook portion hooks the lock portion for fastening the circuit board.

The conventional electric card fastener can fasten the lock portion of the electric card by the hooks of the hook members so as to fasten the electric card. However, the fastener is made of plastic material and the electric card is restricted in the hook member by compulsion when using. Since the conventional fastener only adapts small hook to fasten the lock portion of the electric card, after multiple uses (detachment), the electric card or the hook member may wear and crack down and be hard to replace due to its plastic material. Therefore, when shaking, the electric card might flip upward. Moreover, since the conventional fastener is made of plastic material, the hook member can not be used for ground connection if there is any grounding circuit on the circuit board. Accordingly, the conventional fastener can hardly meet users' needs.

SUMMARY OF THE INVENTION

The main objective of the present invention is that the electric card fastener fastens the electric card in a predetermined position for preventing poor electrical connection.

Another objective of the present invention is to strengthen the construction of components of the present invention for improving support ability.

Still another objective of the present invention is to use the fastening components as a short cut for the grounding circuit on the electric card to connect ground.

To achieve the above objectives, the present invention provides an electric card fastener with elastic metal cantilever. The electric card fastener is formed by a corresponding mounted base. The mounted base includes a cantilever with a restricted portion disposed along, and a mounted portion on the button, connecting with one end of the cantilever. After the connecting of the cantilever and the mounted portion, the cantilever is elastic for backward and forward movement. Whereby, the electric card fastener fastens the electric card in a predetermined position for preventing poor electrical connection and strengthening the construction of components of the present invention for improving support ability, and the fastening components are used as a short cut for the grounding circuit on the electric card to connect ground.

BRIEF DESCRIPTION OF THE DRAWINGS

The present invention will be better understood from the following detailed description of preferred embodiments of the invention, taken in conjunction with the accompanying drawings, in which

FIGS. 3-1, 3-2, and 3-3 illustrate how the elastic metal cantilever is like in use according to the present invention.

DETAIL DESCRIPTION OF THE INVENTION

The following descriptions of the preferred embodiments are provided to understand the features and the structures of the present invention.

Figure 1:
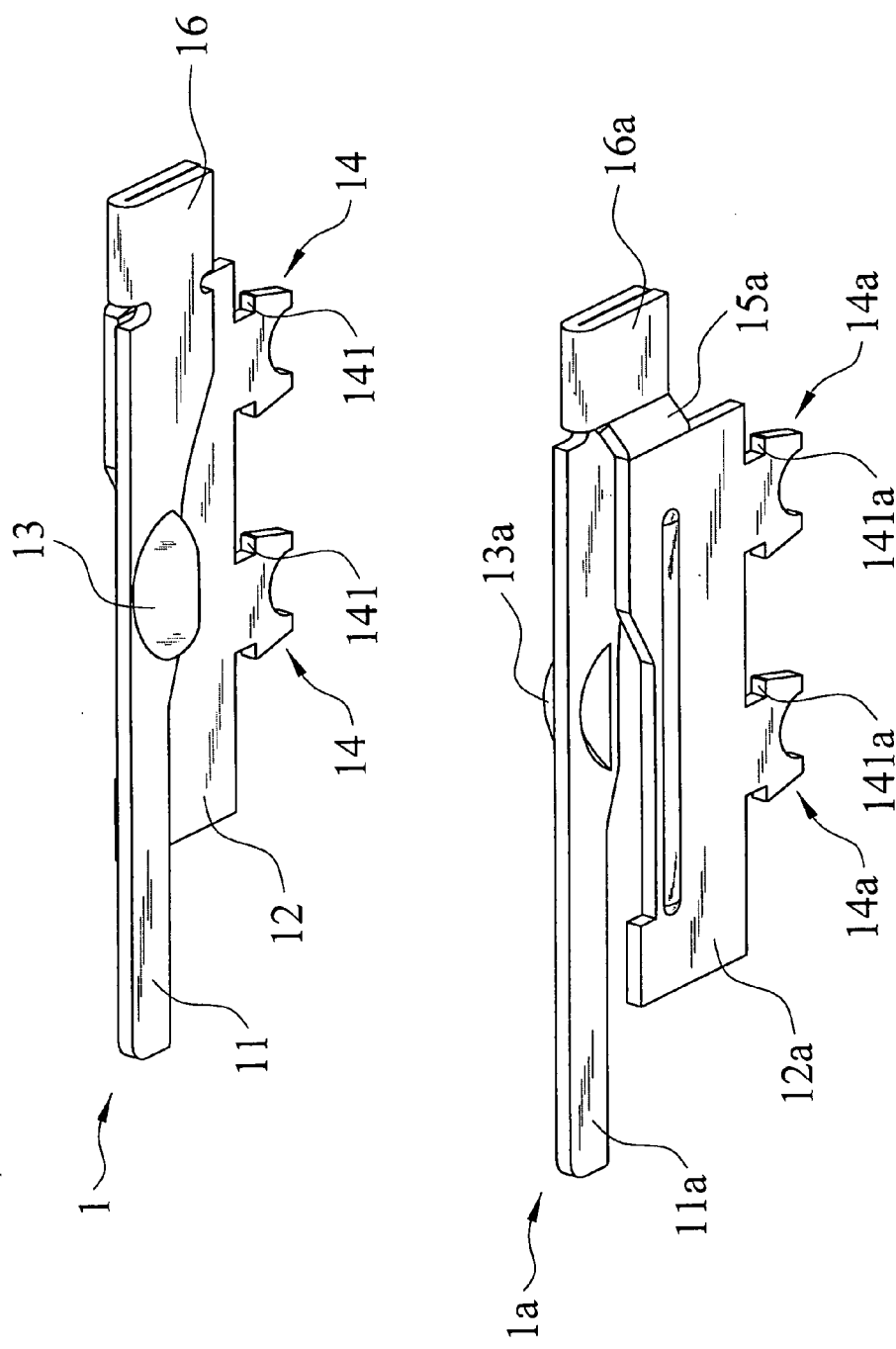
FIG. 1 is a diagram showing an outward appearance according to the present invention.
Figure 2:
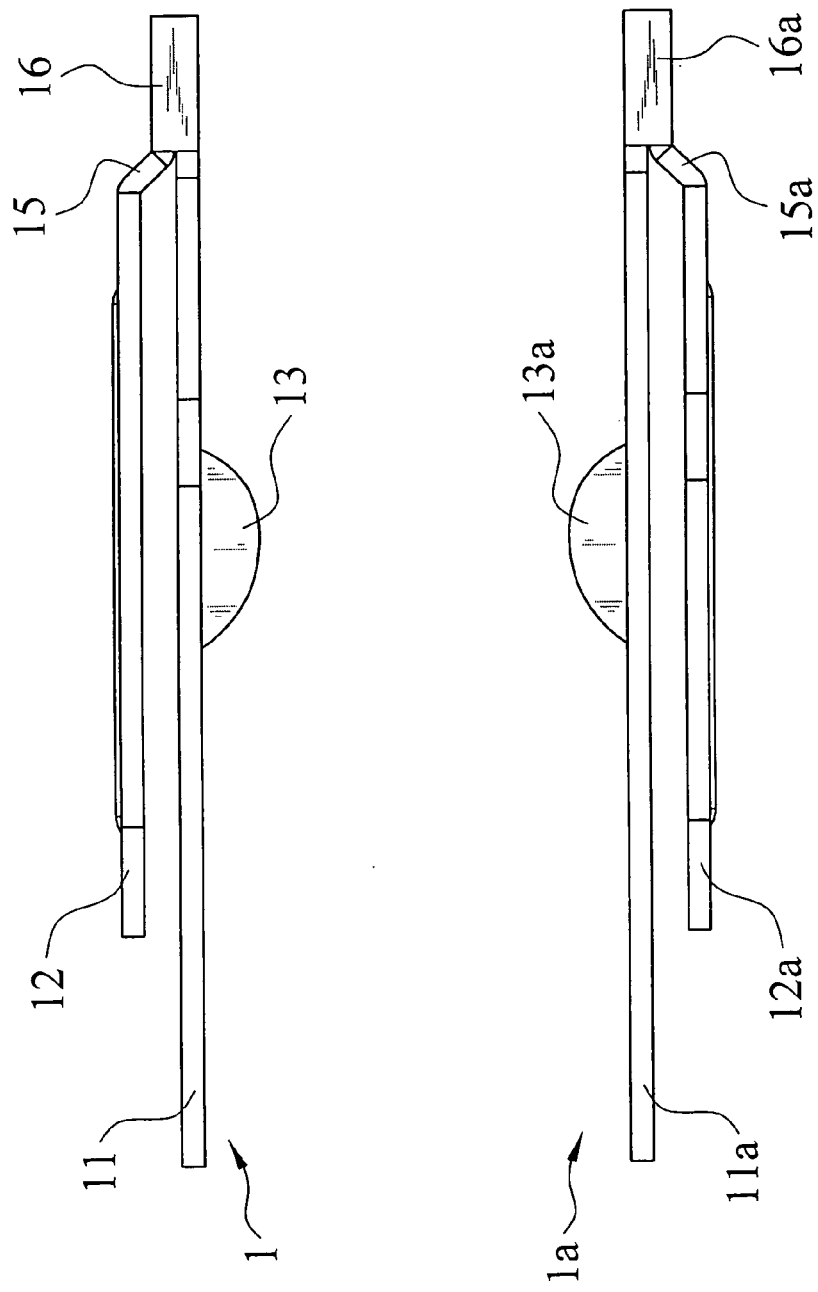
FIG. 2 is a diagram showing a top plane view according to the present invention.

FIG. 1 and FIG. 2 are respectively a diagram showing an outward appearance of the present invention and a diagram showing a top plane view of the present invention. As shown in the drawings, the present invention provides an electric card fastener with elastic metal cantilever, configured to a circuit board, for fastening an electric card. The electric card fastener is formed by two corresponding mounted bases 1 and 1a. The mounted bases 1 and 1a include cantilevers 11 and 11a, and a mounted portion 12 and 12a. By the mounted portions 12 and 12a, the mounted bases 1 and 1a are easy to be fabricated on the circuit board 2. Moreover, by the cantilevers 11 and 11a, the electric card 3 will not flip upward readily and be easier for replacement. The cantilevers 11 and 11a and the mounted portion 12 and 12a are formed by bending a one-piece metal material for the mounted bases 1 and 1a to connect to ground.

The restricted portions 13 and 13a are disposed along the cantilevers 11 and 11a. The restricted portions 13 and 13a are in a cambered protruding shape.

One end of the mounted portion 12 and 12a connects to one end of the cantilevers 11 and 11a. A bottom of the mounted portion 12 and 12a have one or at least one joint portion 14 and 14a. Hooks 141 and 141a are respectively disposed on each side of one or at least one joint portion 14 and 14a. One end of the mounted portion 12 and 12a further have an extended portion 15 and 15a inclining outward. A connecting portion 16 and 16a are extended from one end of the extended portion 15 and 15a connecting with the cantilevers 11 and 11a. Whereby, a novel electric card fastener with elastic metal cantilever is constructed.

Figures 1, 3:
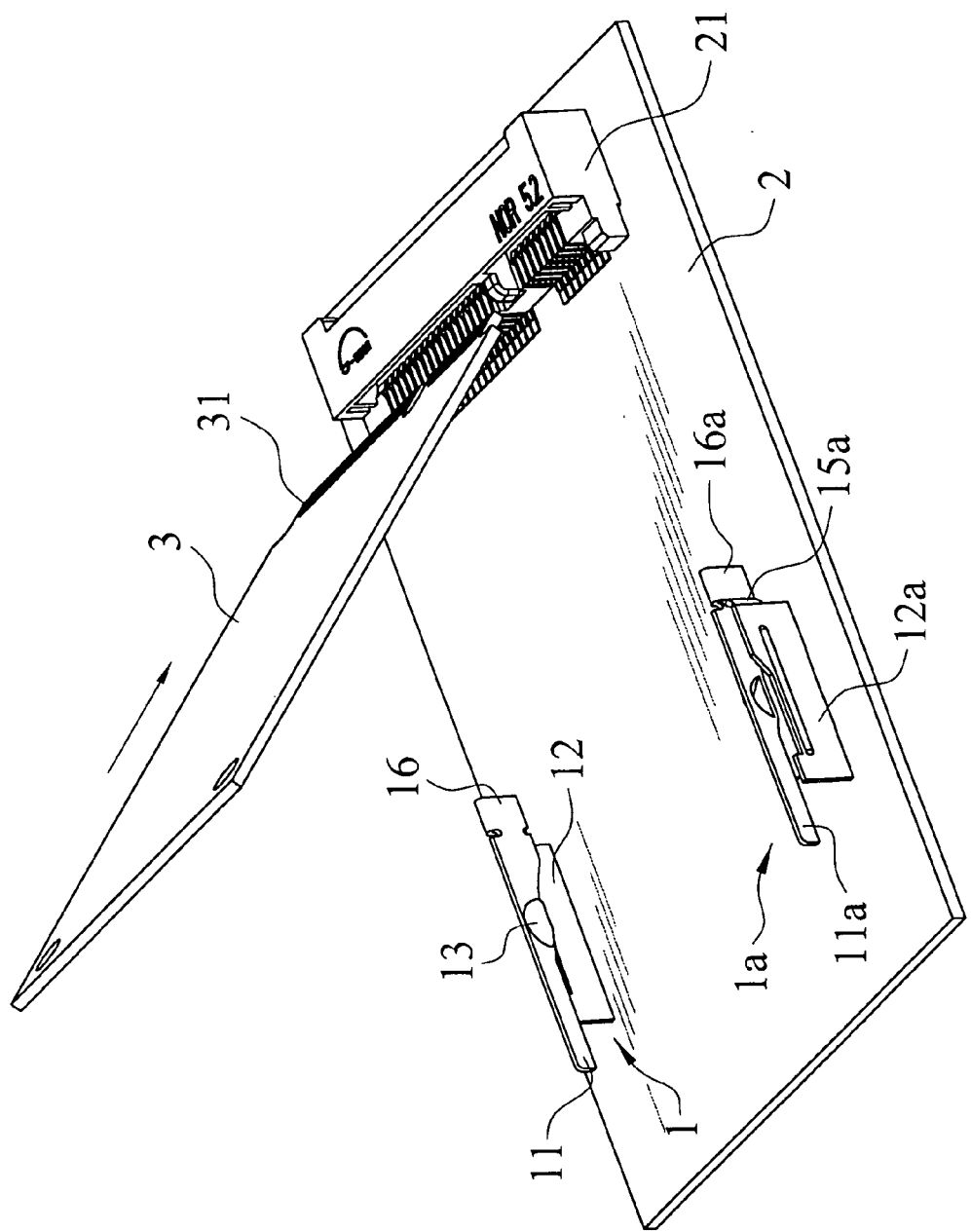
Figures 2, 3:
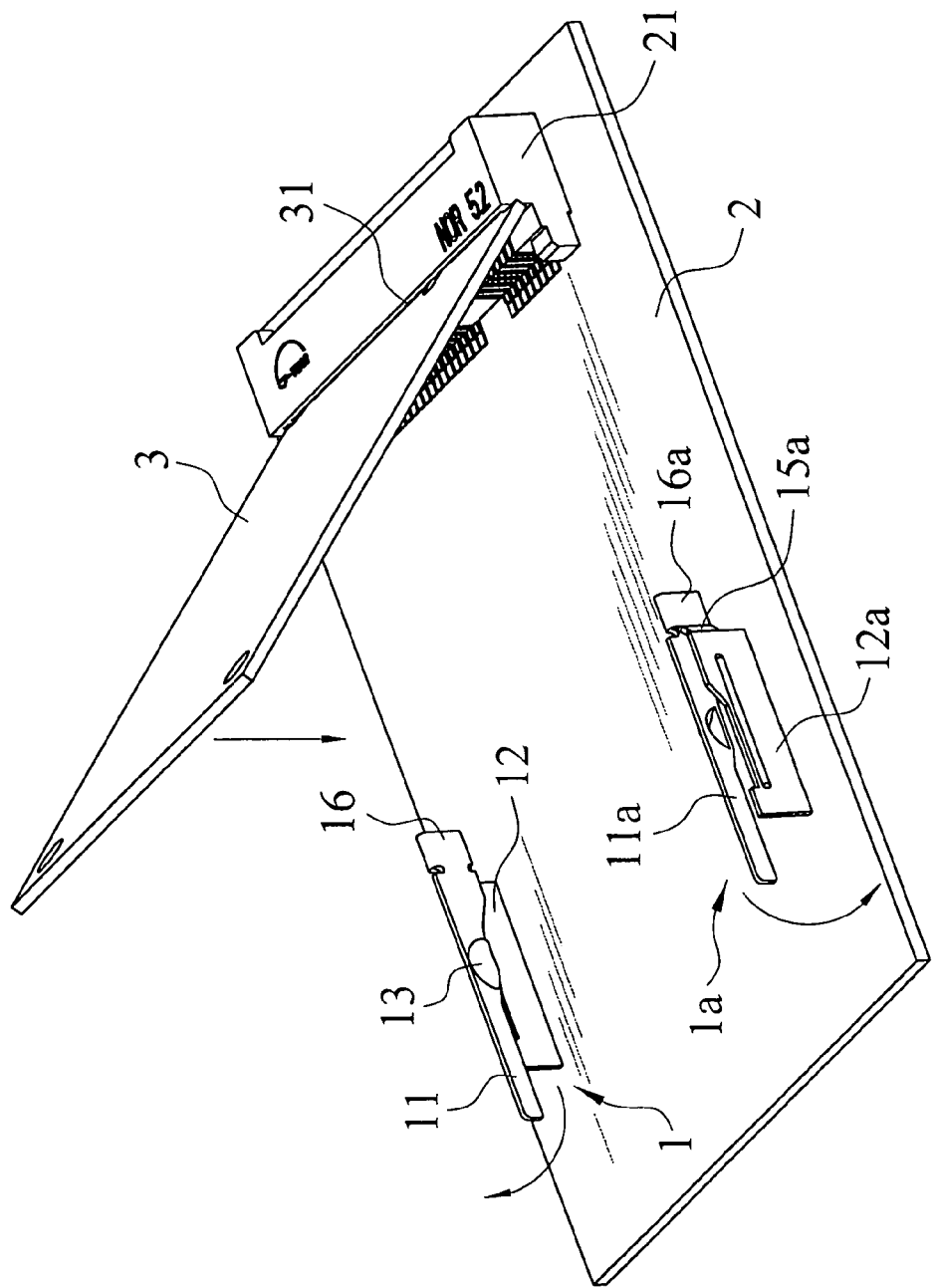
Figure 3:
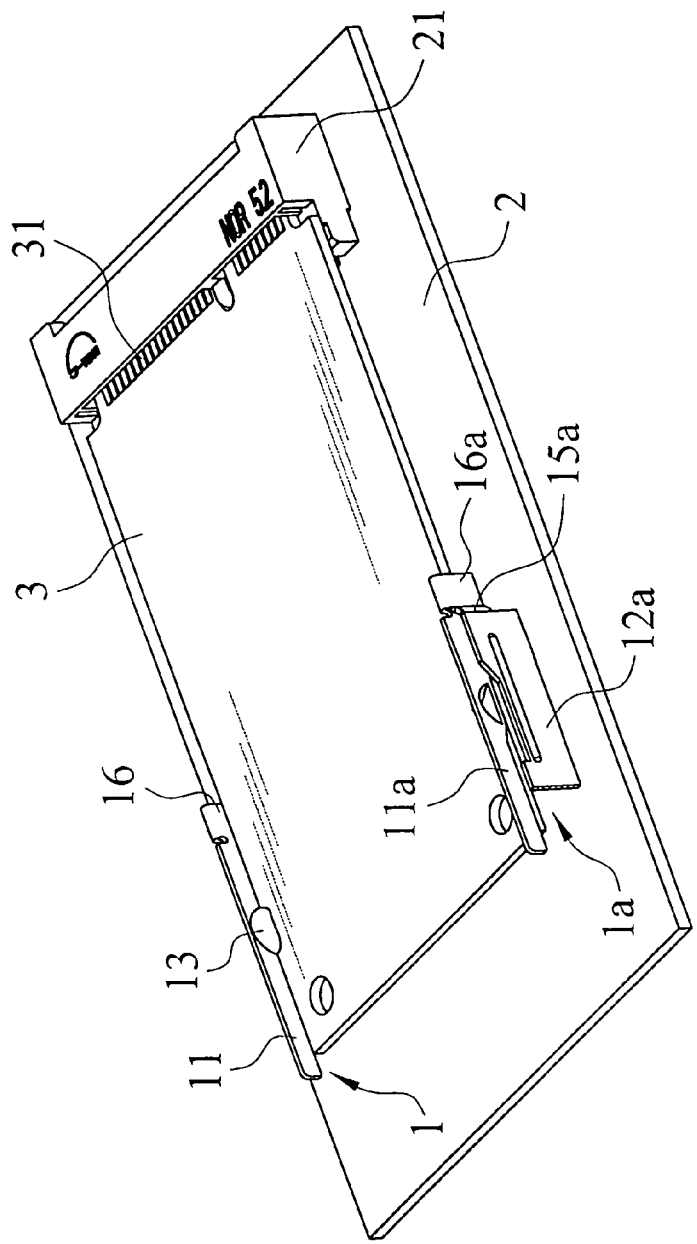

FIGS. 3-1, 3-2, and 3-3 illustrate how the elastic metal cantilever is like in use according to the present invention. As shown in drawings, while using, the two mounted base 1 and 1a of the present invention can be mounted on a circuit board 2. The distance between the two mounted bases 1 and 1a depends on the size of the electric card 3. The restricted portions 13 and 13a are disposed corresponding to the cantilevers 11 and 11a. One or at least one joint portion 14 and 14a at the button of the mounted portion 12 and 12a is disposed in a corresponding pre-installed hole (not shown) on the circuit board 2. One or at least one joint portion 14 and 14a are locked together by the hooks 141 and 141a disposed at its each side. Therefore, one or at least one joint portion 14 and 14a can mount the mounted portion 12 and 12a in the hole on the circuit board 2. Accordingly, the two mounted bases 1 and 1*a* are fabricated on the circuit board 2 by puncturing through the board. Furthermore, one or at least one joint portion 14 and 14*a* can mount the mounted portion 12 and 12*a* on the circuit board without puncturing through the board by surface mounted technology.

When users insert the electric card 3, one end of the contacting part 31 of the electric card 3 is inclinedly inserted to the connector 21 on the circuit board 2 and pushed down toward the circuit board 2, so that the electric card 2 can contract with the restricted portion 13 and 13*a* of in a cambered protruding shape on the cantilevers 11 and 11*a*. By the feature of its cambered protruding shape and the connecting portion 16 and 16*a*, the cantilevers 11 and 11*a* are elastic for backward and forward movement so as to be propped out toward the electric card 3. Until the electric card 3 is pushed down to the restricted portion 13 and 13*a* on the cantilevers 111 and 11*a*, the cantilevers 11 and 11*a* will draw backward elastically and restrict the electric card 3 from flipping upward.

As mentioned above, the electric card fastener with elastic metal cantilever of the present invention is able to improve various conventional shortcomings, becomes more advanced and functional, and therefore meets users' needs. From the above detail description, persons skilled in the art should understand that the present invention truly can achieve the above objective, which is patentable.

The description mention above is only a preferred embodiment of the present invention, which is not a limitation to the scope of the claimed invention. Therefore, any modification and variation in according with the claims and the specification of the present invention shall be covered within the scope of the present invention.

What is claimed is:

1. An electric card fastener for connecting an electric card to a printed circuit board comprising:
    two bases spaced apart from a connector located on the printed circuit board, each of the two bases having:
    a) a connecting portion;
    b) a cantilever connected to the connecting portion at a connected end thereof, the cantilever having a restricted portion located between the connected end and a free end thereof, each restricted portion selectively engaging one side of the electric card;
    c) a mounted portion connected to the connecting portion at one end thereof and to the printed circuit board at a bottom thereof; and
    d) an extended portion located between the mounted portion and the connecting portion.

2. The electric card fastener according to claim 1, wherein the restricted portion of each of the two bases has a protruding cambered shape.

3. The electric card fastener according to claim 1, wherein each of the two bases is formed from a single metal piece.

4. The electric card fastener according to claim 1, wherein the mounted portion of each of the two bases has at least one joint portion protruding downwardly from the bottom thereof and connected to the printed circuit board.

5. The electric card fastener according to claim 4, wherein each of the at least one joint portion has two hooks located on opposite sides thereof.

6. The electric card fastener according to claim 1, wherein the mounted portion of each of the two bases is connected to the printed circuit board by surface mounting.

* * * * *